(12) United States Patent
Zhou et al.

(10) Patent No.: US 9,720,247 B2
(45) Date of Patent: Aug. 1, 2017

(54) THREE-DIMENSIONAL DISPLAY SYSTEM

(71) Applicants: BOE TECHNOLOGY GROUP CO., LTD., Beijing (CN); BEIJING BOE DISPLAY TECHNOLOGY CO., LTD., Beijing (CN)

(72) Inventors: Bo Zhou, Beijing (CN); Yongzhi Song, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 55 days.

(21) Appl. No.: 14/435,692

(22) PCT Filed: Jul. 31, 2014

(86) PCT No.: PCT/CN2014/083422
§ 371 (c)(1),
(2) Date: Apr. 14, 2015

(87) PCT Pub. No.: WO2015/139405
PCT Pub. Date: Sep. 24, 2015

(65) Prior Publication Data
US 2016/0252736 A1  Sep. 1, 2016

(30) Foreign Application Priority Data

Mar. 19, 2014  (CN) .......................... 2014 1 0103276

(51) Int. Cl.
G02B 27/22 (2006.01)
G02B 26/00 (2006.01)

(52) U.S. Cl.
CPC ......... *G02B 27/2214* (2013.01); *G02B 26/00* (2013.01); *G02B 26/004* (2013.01); *G02B 27/22* (2013.01)

(58) Field of Classification Search
CPC .... G02B 27/22; G02B 27/2214; G02B 26/00; G02B 26/06
(Continued)

(56) References Cited

U.S. PATENT DOCUMENTS 6,049,424 A * 4/2000 Hamagishi ......... G02B 27/2214
345/419
6,337,721 B1 * 1/2002 Hamagishi ......... G02B 27/2214
348/E13.029
(Continued)

FOREIGN PATENT DOCUMENTS

CN  101511037 A  8/2009
CN  101726846 A  6/2010
(Continued)

OTHER PUBLICATIONS

Office Action in Chinese Application No. 201410103276.2 with English translation dated Sep. 6, 2015. 10 pages.
(Continued)

Primary Examiner — William R Alexander
(74) Attorney, Agent, or Firm — Blakely Sokoloff Taylor & Zafman LLP

(57) ABSTRACT

The present disclosure discloses a three-dimensional display system, comprising a display device and a barrier located at the light emergent side of the display device. Addition of the distance adjusting structure, which adjusts the viewing distance of the three-dimensional display system by adjusting the distance between the display device and the barrier, between the display device and the barrier allows the three-dimensional display system free from limitation of a fixed viewing distance, thus resulting in a stronger spatially adapting capability and a broader application scope thereof.

10 Claims, 3 Drawing Sheets

(58) Field of Classification Search
USPC .............. 359/462, 476, 477; 348/42, 51; 345/419; 349/15
See application file for complete search history.

(56) References Cited

U.S. PATENT DOCUMENTS

| | | | | |
|---|---|---|---|---|
| 8,238,024 B2* | 8/2012 | Tzschoppe | ......... | H04N 13/0454 359/462 |
| 2002/0036825 A1* | 3/2002 | Lipton | ......... | G02B 27/2214 359/463 |
| 2004/0139635 A1* | 7/2004 | McKinley | ......... | G03B 27/10 40/454 |
| 2005/0264881 A1* | 12/2005 | Takagi | ......... | H04N 13/0404 359/463 |
| 2010/0207961 A1 | 8/2010 | Zomet | | |
| 2011/0038044 A1* | 2/2011 | Kim | ......... | G02B 27/2214 359/463 |
| 2012/0019908 A1* | 1/2012 | Choi | ......... | G02B 27/2214 359/463 |
| 2012/0162201 A1* | 6/2012 | Choi | ......... | H04N 13/0409 345/419 |
| 2012/0182407 A1* | 7/2012 | Yoshida | ......... | G02B 27/2214 348/54 |
| 2013/0050596 A1* | 2/2013 | Chen | ......... | G02F 1/1323 349/15 |
| 2013/0076724 A1* | 3/2013 | Park | ......... | G02B 27/2264 345/212 |
| 2013/0120535 A1* | 5/2013 | Cha | ......... | H04N 13/0014 348/46 |
| 2013/0147930 A1* | 6/2013 | Hirai | ......... | H04N 13/04 348/54 |
| 2015/0286062 A1* | 10/2015 | Zheng | ......... | G02B 3/005 349/57 |
| 2016/0041383 A1* | 2/2016 | Wang | ......... | G02B 3/14 359/463 |
| 2016/0345002 A1* | 11/2016 | Wu | ......... | G02B 26/004 |

FOREIGN PATENT DOCUMENTS

| | | | | |
|---|---|---|---|---|
| CN | 101873507 A | | 10/2010 | |
| CN | 101915997 A | | 12/2010 | |
| CN | 101990106 A | | 3/2011 | |
| CN | 202870459 U | | 4/2013 | |
| CN | 103439815 A | | 12/2013 | |
| CN | 103913847 A | | 7/2014 | |
| JP | 08068961 A | * | 3/1996 | ............ G02B 27/22 |
| KR | 20130035587 A | | 4/2013 | |

OTHER PUBLICATIONS

Office Action in Chinese Application No. 201410103276.2 with English translation. 10 pages.

* cited by examiner

THREE-DIMENSIONAL DISPLAY SYSTEM

The present patent application is a national phase application of International Application No. PCT/CN2014/083422, filed Jul. 31, 2014.

FIELD OF DISCLOSURE

The present disclosure relates to the field of display technology, particularly to a three-dimensional display system.

BACKGROUND

At present, the three-dimensional (3D) display technology has received great attention, which can render a picture stereoscopic and thus vivid, based on the basic principle that with the left and right eyes receiving different pictures, respectively, the human brain overlaps and reproduces the received image information to construct a stereoscopic image.

An existing important display apparatus capable of realizing 3D display provides a shelter, such as a slit barrier or a liquid crystal barrier, on the light emergent side of the display panel, with the slit barrier or the liquid crystal barrier forming several fields of view on the light emergent side of the display panel. As shown in FIG. 1, taking the display panel provided with a slit barrier 101 on the light emergent side as an example, with the light emitted by different sub-pixel units 102 (taking 5 different sub-pixel units as an example in FIG. 1) on the display panel shining on different fields of view, a 3D effect may be created when the two eyes 103 of the viewer fall in different fields of view. As shown in FIG. 1, a is the distance between the sub-pixel unit 102 on the display panel and the slit barrier 101, and b is the viewing distance of the display apparatus, i.e. the distance between the sub-pixel unit 102 on the display panel and the two eyes 103 of the viewer.

In the existing 3D display technology, the viewing distance b at which the viewer views the display panel is fixed, due to a fixed distance a between the slit barrier or the liquid crystal barrier and the display panel. When the viewer views the display panel at a distance other than the viewing distance b, a crosstalk which affects the 3D display effect will be produced, thus greatly limiting the application scope of the 3D display.

Therefore, how to prevent the 3D display from limitation of a fixed viewing distance is an urgent technical problem to be addressed by the skilled in the art.

SUMMARY OF THE DISCLOSURE

In view of this, an embodiment of the present disclosure provides a three-dimensional display system to prevent the 3D display from limitation of a fixed viewing distance.

Thus, an embodiment of the present disclosure provides a three-dimensional display system, comprising a display device and a barrier located at the light emergent side of the display device; further comprising a distance adjusting structure arranged between the display device and the barrier, the distance adjusting structure being used to adjust the viewing distance of the three-dimensional display system by adjusting the distance between the display device and the barrier.

In the three-dimensional display system provided by the embodiment of the disclosure, addition of the distance adjusting structure, which adjusts the viewing distance of the three-dimensional display system by adjusting the distance between the display device and the barrier, between the display device and the barrier allows the three-dimensional display system free from limitation of a fixed viewing distance, thus resulting in a stronger spatially adapting capability and a broader application scope thereof.

Specifically, in the three-dimensional display system provided by the embodiment of the disclosure, the display device consists of a display region and a boundary-closed non-display region encompassing the display region.

The distance adjusting structure comprises at least one hollow cavity arranged at the non-display region, the volume of the hollow cavity being made increased or decreased accordingly by inputting or outputting gas or liquid to/from the hollow cavity.

Preferably, in order to keep the barrier as a whole in parallel to the display device when moving with respect to the display device, in the three-dimensional display system provided by the embodiment of the disclosure, the hollow cavity is a loop cavity.

Optionally, the at least one hollow cavity is multiple ones which are arranged uniformly or non-uniformly at the non-display region.

Further, in the three-dimensional display system provided by the embodiment of the disclosure, the distance adjusting structure further comprises:

at least one pair of an inlet and an outlet arranged on the wall of the hollow cavity, an input pressure pump connected with the inlet, an output pressure pump connected with the outlet, an input valve arranged between the inlet and the input pressure pump, and an output valve arranged between the outlet and the output pressure pump.

Specifically, the input pressure pump and the output pressure pump are integrated into one pressure pump, or are two separate pressure pumps.

Preferably, in the three-dimensional display system provided by the embodiment of the disclosure, the input pressure pump and the output pressure pump are of pneumatic type or of hydraulic type.

Further, in the case that the input pressure pump and the output pressure pump are two separate pressure pumps, the input pressure pump and the output pressure pump are of the same or different type.

Preferably, in order for a uniform throughput of the gas or liquid to/from the hollow cavity to ensure a parallel display device with respect to the barrier, and thus the display effect of the three-dimensional display system, in the three-dimensional display system provided by the embodiment of the disclosure, in the hollow cavity, every two neighboring pairs of the inlets and the outlets are equally spaced.

Further, in order for a precise control of the variation in the volume of the hollow cavity, and thus a precise adjustment of the distance between the display device and the barrier, so as to precisely adjust the viewing distance of the three-dimensional display system, in the three-dimensional display system provided by the embodiment of the disclosure, the distance adjusting structure further comprises: a first flow controller arranged between the inlet and the input valve or between the input valve and the input pressure pump; and a second flow controller arranged between the outlet and the output valve or between the output valve and the output pressure pump.

Optionally, the area of the cross section of the hollow cavity at different depths in the depth direction of the display is constant or non-constant, the depth direction being the direction perpendicular to the display plane of the display.

Optionally, the amount of increase or decrease in the volume of the hollow cavity is calculated in real time or obtained by looking up a lookup table.

Specifically, in the three-dimensional display system provided by the embodiment of the disclosure, the barrier is a slit barrier or a liquid crystal barrier.

Specifically, in the three-dimensional display system provided by the embodiment of the disclosure, the display device is a liquid crystal display device or an organic electroluminescence display device.

DETAILED DESCRIPTION

The three-dimensional display system provided by embodiments of the disclosure is described below in detail, with reference to the appended drawings.

Figure 1:
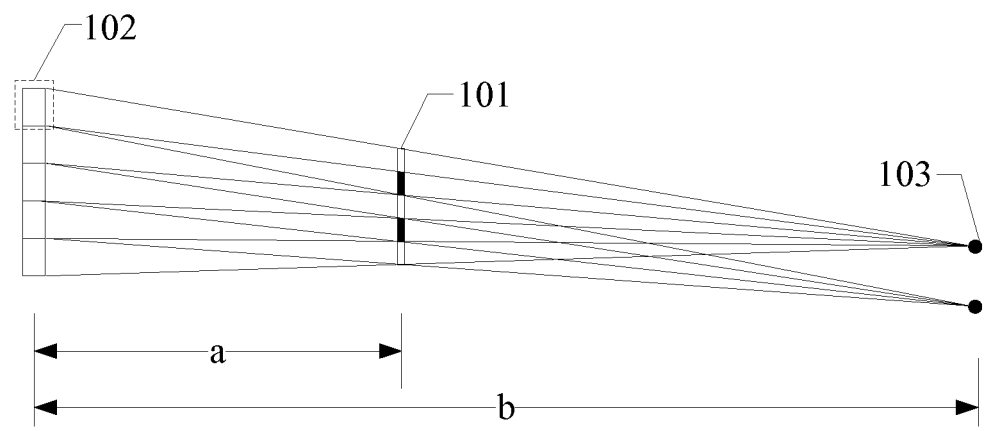
FIG. 1 is a schematic diagram of the light path of a three-dimensional display apparatus in the prior art.
Figure 2:
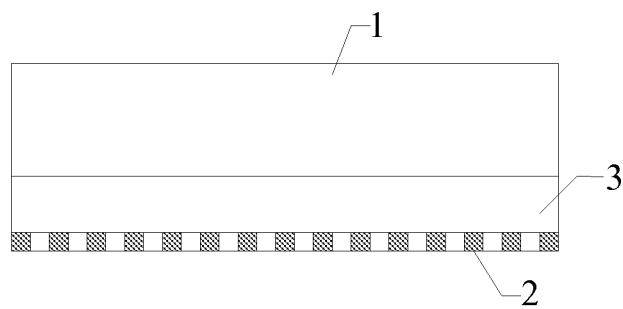
FIG. 2 is a schematic diagram of the structural side view of the three-dimensional display system provided by an embodiment of the disclosure.

A three-dimensional display system provided by an embodiment of the present disclosure, as shown in FIG. 2, comprising: a display device 1, and a barrier 2 located at the light emergent side of the display device 1; further comprising: a distance adjusting structure 3 arranged between the display device 1 and the barrier 2, the distance adjusting structure 3 being used to adjust the viewing distance of the three-dimensional display system by adjusting the distance between the display device 1 and the barrier 2.

In the three-dimensional display system provided by the embodiment of the disclosure, addition of the distance adjusting structure 3, which adjusts the viewing distance of the three-dimensional display system by adjusting the distance between the display device 1 and the barrier 2, between the display device 1 and the barrier 2 allows the three-dimensional display system free from limitation of a fixed viewing distance, thus resulting in a stronger spatially adapting capability and a broader application scope thereof.

Figure 3A:
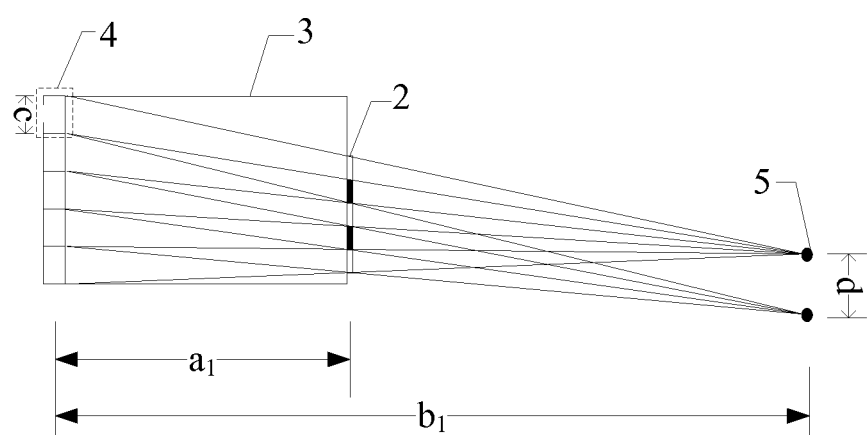
FIGS. 3a and 3b are the light path of the three-dimensional display system provided by an embodiment of the disclosure before and after the viewing distance adjustment, respectively.
Figure 3B:
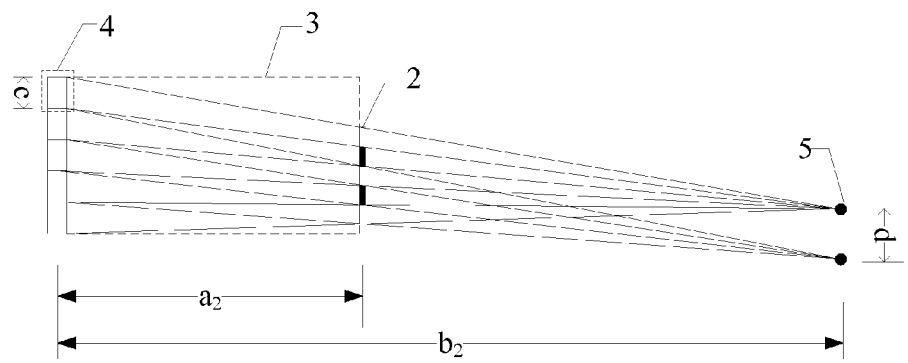

FIGS. 3a and 3b are the light path of the three-dimensional display system provided by an embodiment of the disclosure before and after the viewing distance adjustment, respectively. As shown in FIG. 3a, the distance between the individual sub-pixel units 4 in the display device 1 and the barrier 2 is $a_1$, and the viewing distance of the three-dimensional display system, i.e. the distance between the individual sub-pixel units 4 in the display device 1 and the two eyes 5 of the viewer is $b_1$. As shown in FIG. 3b, after adjustment of the distance adjusting structure 3, the distance between the individual sub-pixel units 4 in the display device 1 and the barrier 2 turns to $a_2$, and the viewing distance of the three-dimensional display system, i.e. the distance between the individual sub-pixel units 4 in the display device 1 and the two eyes 5 of the viewer turns to $b_2$. Thus, through the adjustment by the distance adjusting structure 3, the variation in the distance between the individual sub-pixel units 4 in the display device 1 and the barrier 2 is $\Delta a = a_2 - a_1$, and the variation in the viewing distance of the three-dimensional display system is $\Delta b = b_2 - b_1$.

Specifically, while the distance between the individual sub-pixel units 4 in the display device 1 and the barrier 2 varies by $\Delta a$, the viewing distance of the three-dimensional display system varies by $\Delta b$ accordingly. The relationship between the variation $\Delta a$ of the distance between the individual sub-pixel units 4 in the display device 1 and the barrier 2 and the variation $\Delta b$ of the viewing distance of the three-dimensional display system is $$\frac{\Delta a}{\Delta b} = \frac{a_1}{b_1} = \frac{a_2}{b_2} = \frac{c}{c+d},$$

where c is the width of the sub-pixel unit 4, and d is the distance between the eyes 5 of the viewer. For example, with the width c of the sub-pixel unit 4 being 90 μm and the distance d between the eyes 5 of the viewer being 5 cm, if the viewing distance of the three-dimensional display system needs to be increased by 1 in (i.e. $\Delta b = 1$ m), then it can be calculated that the distance between the individual sub-pixel units 4 in the display device 1 and the barrier 2 needs to be increased by about 1.8 mm.

Figure 4A:
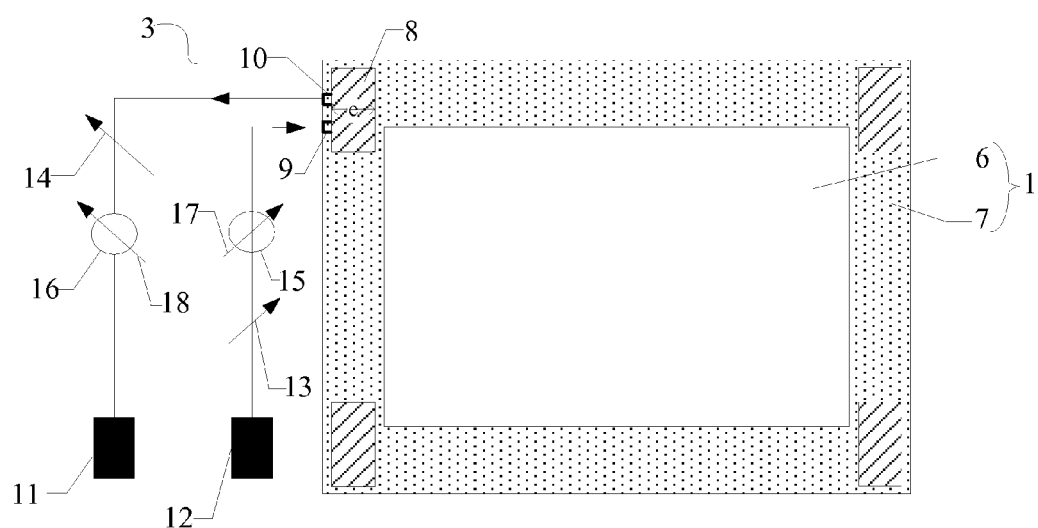
FIGS. 4a and 4b are a schematic diagram of the structural plan view of the three-dimensional display system provided by embodiments of the disclosure, respectively.
Figure 4B:
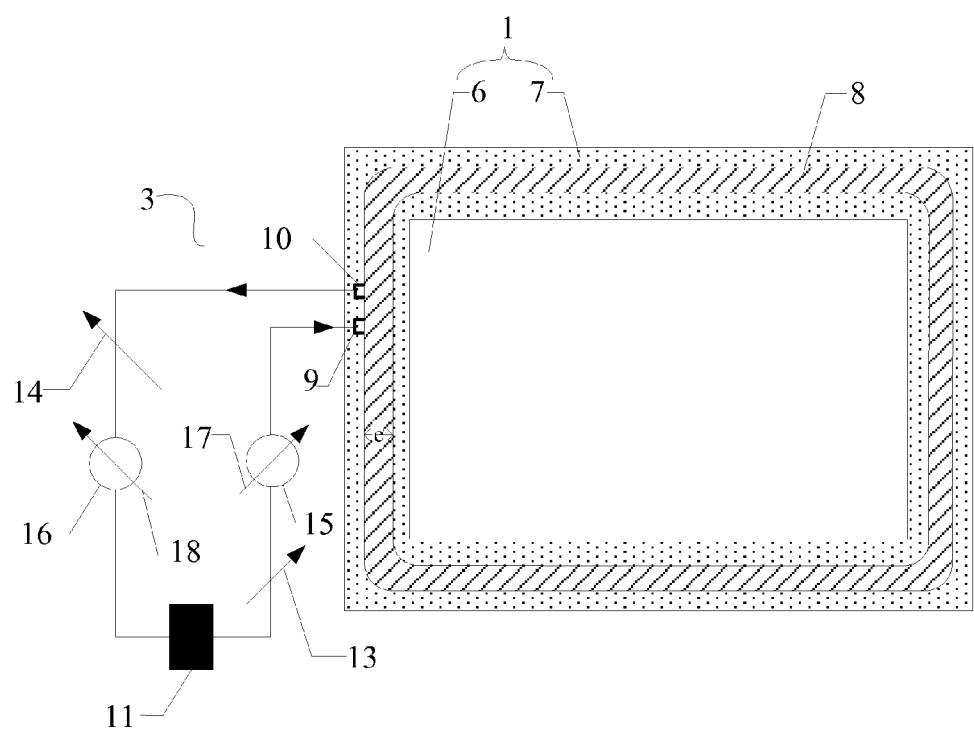

Specifically, in an implementation of the three-dimensional display system provided by the embodiment of the disclosure, as shown in FIGS. 4a and 4b, the display device 1 may consist of a display region 6 and a boundary-closed non-display region 7 encompassing the display region 6. The distance adjusting structure 3 may specifically comprise at least one hollow cavity 8 arranged at the non-display region 7, the volume of the hollow cavity 8 being made increased or decreased accordingly by inputting or outputting gas or liquid to/from the hollow cavity 8, such that the distance between the display device 1 and the barrier 2 (not shown in FIGS. 4a and 4b) may be changed, and, in turn, an adjustable viewing distance of the three-dimensional display system can be achieved.

FIG. 4a illustrates a display device 1 provided with four hollow cavities 8 in the non-display region 7. In order to ensure a parallel display device 1 with respect to the barrier 2, and thus the display effect of the three-dimensional display system, multiple hollow cavities 8 may be uniformly arranged at the non-display region 7 of the display device 1. FIG. 4a illustrates four hollow cavities 8 arranged, respectively, at the four corners of the non-display region 7 of the display device 1. Of course, the number of the hollow cavities 8 as shown in FIG. 4a is not limited to 4. Moreover, the way in which the hollow cavities 8 are distributed may be other forms, such as in a non-uniform way, which is not limited here.

Preferably, in order to keep the barrier 2 as a whole in parallel to the display device 1 when moving with respect to the display device 1, in an implementation of the three-dimensional display system provided by the embodiment of the disclosure, as shown in FIG. 4b, the distance adjusting structure 3 may comprise only one hollow cavity 8, which is a loop cavity that encompasses the display region 6.

Specifically, in the distance adjusting structure 3 as shown in FIGS. 4a and 4b, the width e of the projection of the hollow cavity 8 on the non-display region 7 of the display device 1 is generally set to be larger than 0 mm and smaller than or equal to 25 mm.

In an embodiment of the disclosure, assuming that the area of the cross section of the hollow cavity 8 is constant at different depths in the depth direction of the display device 1 (i.e. the direction perpendicular to the display plane of the display device 1), in the case that the viewing distance of the three-dimensional display system needs to be adjusted by Δb and the distance between the individual sub-pixel units 4 in the display device 1 and the barrier 2 needs to be adjusted by Δa, then the volume of the hollow cavity 8 needs to be changed by $$\Delta V = \Delta a * S = \frac{c}{c+d} * \Delta b * S,$$

where S is the area of the cross section of the hollow cavity 8. For example, the area of the cross section of the hollow cavity 8 being 100 mm², if the viewing distance of the three-dimensional display system needs to be increased by 1 in and the distance between the display device 1 and the barrier 2 needs to be increased by 1.8 mm, then the volume of the hollow cavity 8 needs to be changed by 0.18 mL.

It should be understood by the skilled in the art that in other embodiments of the disclosure, the area of the cross section of the hollow cavity 8 may not be constant at different depths in the depth direction of the display device 1. In this case, the required variation in the volume of the hollow cavity 8 may be calculated in real time for a viewing distance adjustment. For example, depending on the shape and area of the cross section of the hollow cavity 8, the required variation in the volume of the hollow cavity 8 may be calculated in real time, utilizing the viewing distance adjustment value Δb required for the three-dimensional display system, as well as the relationship between the viewing distance adjustment value Δb and the variation Δa in the distance between the individual sub-pixel units 4 in the display device 1 and the barrier 2. Thereby, the input/output pressure pump is controlled to input/output the gas or liquid to achieve a viewing distance adjustment of the three-dimensional display system. Alternatively, in order to reduce the computation overhead and to improve the processing speed of the system, the required variation in the volume of the hollow cavity 8 may also be obtained by looking up a Look Up Table (LUT). For example, the correspondence among the current viewing distance of the three-dimensional system, the required viewing distance adjustment value Δb and the variation in the volume of the hollow cavity 8 being stored in advance in a memory as a LUT, in adjusting the viewing distance, the required variation in the volume of the hollow cavity 8 corresponding to the required viewing distance adjustment value Δb may be obtained under the current viewing distance by looking up the LUT, and in turn the input/output pressure pump may be controlled accordingly to input/output the gas or liquid.

Specifically, in an implementation of the three-dimensional display system provided by the embodiment of the disclosure, as shown in FIG. 4a, the distance adjusting structure 3 may further comprise at least one pair of an inlet 9 and an outlet 10 arranged on the wall of the hollow cavity 8, an input pressure pump 11 connected with the inlet 9, an output pressure pump 12 connected with the outlet 10, an input valve 13 arranged between the inlet 9 and the input pressure pump 11, and an output valve 14 arranged between the outlet 10 and the output pressure pump 12. When the input valve 13 is opened, the input pressure pump 11 pumps the gas or liquid into the hollow cavity 8, and when the output valve 14 is opened, the output pressure pump 12 pumps the gas or liquid out of the hollow cavity 8. While FIG. 4a illustrates only one hollow cavity 8 connecting to an input pressure pump 11 and an output pressure pump 12, the other three hollow cavities 8 each are connected to a respective input pressure pump 11 and a respective output pressure pump 12 in a similar manner, which is not discussed in detail.

When the three-dimensional display system provided by the embodiment of the disclosure is used for normal 3D display, i.e. the viewing distance of the three-dimensional display system provided by the embodiment of the disclosure needs not to be adjusted, the input valve 13 and the output valve 14 are in a closed state, the distance between the display device 1 and the barrier 2 is fixed, and the viewing distance of the three-dimensional display system is fixed, ensuring a display effect of the three-dimensional display system. When the viewing distance of the three-dimensional display system provided by the embodiment of the disclosure needs to be increased, the input valve 13 is in a open state, and the output valve 14 is in the closed state, then the input pressure pump 11 pumps the gas or liquid into the hollow cavity 8 such that the distance between the display device 1 and the barrier 2 is increased, thus resulting in an increased viewing distance of the three-dimensional display system. When the viewing distance of the three-dimensional display system provided by the embodiment of the disclosure needs to be decreased, the input valve 13 is in the closed state, and the output valve 14 is in the open state, then the output pressure pump 12 pumps the gas or liquid out of the hollow cavity 8 such that the distance between the display device 1 and the barrier 2 is decreased, thus resulting in a decreased viewing distance of the three-dimensional display system.

In an implementation of the three-dimensional display system provided by the embodiment of the disclosure, as shown in FIG. 4a, the input pressure pump 11 and the output pressure pump 12 may be separate and arranged to be connected to the inlet 9 and the outlet 10, respectively. Alternatively, as shown in FIG. 4b, the input pressure pump 11 and the output pressure pump 12 may be integrated into one pressure pump (illustrated as the input pressure pump 11 in FIG. 4b), with the inlet 9 and the outlet 10 connected thereto, so as to save the production cost.

Preferably, in an implementation of the three-dimensional display system provided by the embodiment of the disclosure, sufficient inlets 9 and outlets 10 may be arranged on the wall of the hollow cavity 8, especially for the three-dimensional display system of larger size. In this way, it is ensured that the gas or liquid can be uniformly pumped into/out of the hollow cavity 8 and the display device 1 is parallel to the barrier 2, such that the display effect of the three-dimensional display system is guaranteed. For example, in the four hollow cavities 8 as shown in FIG. 4a, one or more pairs of the inlets 9 and the outlets 10 may be arranged on the wall of each of the hollow cavities 8, respectively; in the hollow cavity 8 as shown in FIG. 4b, one or more pairs of the inlets 9 and the outlets 10 may be arranged on the wall of each of the four sides of the hollow cavity 8, respectively.

To further enable the gas or liquid to be pumped uniformly into/out of the hollow cavity 8, which results in a parallel display device 1 with respect to the barrier 2 and thus a desired display effect of the three-dimensional display system, in a certain hollow cavity 8 of the three-dimensional display system provided by the embodiment of the disclosure (i.e. any of the hollow cavities 8 as shown in FIG. 4a, or the loop hollow cavity 8 as shown in FIG. 4b), every neighboring two pairs of the inlets 9 and the outlets 10 may be equally spaced, i.e. each pair of the inlet 9 and the output 10 is arranged uniformly on the wall of the hollow cavity 8.

Specifically, in an implementation of the three-dimensional display system provided by the embodiment of the disclosure, the input pressure pump 11 and the output pressure pump 12 may be of pneumatic type or of hydraulic type. Moreover, in the case that the input pressure pump 11 and the output pressure pump 12 are two separate pressure pumps, they may be of the same or different type. By means of the pneumatic pump or the hydraulic pump pumping the gas or liquid into/out of the hollow cavity 8, the distance between the barrier 2 and the display device 1 can be adjusted, thus achieving an adjustable viewing distance of the three-dimensional display system.

Specifically, the gas inside the pneumatic pump may be any gas that is stable and safe, and the hydraulic pump may be an oil hydraulic pump or a water hydraulic pump.

Of course, in an implementation of the three-dimensional display system provided by the embodiment of the disclosure, inside the input pressure pump 11 and the output pressure pump 12 may be other substances that are of good liquidity.

Further, in order for a precise control of the variation in the volume of the hollow cavity 8, and thus a precise adjustment of the distance between the display device 1 and the barrier 2, so as to precisely adjust the viewing distance of the three-dimensional display system, in the three-dimensional display system provided by the embodiment of the disclosure, the distance adjusting structure 3 further comprises: a first flow controller 15 arranged between the inlet 9 the input pressure pump 12; and a second flow controller 16 arranged between the outlet 10 and the output pressure pump 11. The first flow controller 15 may specifically be arranged between the inlet 9 and the input valve 13, or arranged between the input valve 13 and the input pressure pump 12. A first flow controlling valve 17 may be arranged inside the first flow controller 15 for controlling the flow of the gas or liquid that is pumped into the hollow cavity 8. The second flow controller 16 may specifically be arranged between the outlet 10 and the output valve 14, or arranged between the output valve 14 and the output pressure pump 11. A second flow controlling valve 18 may be arranged inside the second flow controller 16 for controlling the flow of the gas or liquid that is pumped out of the hollow cavity 8. Depending on the type of the liquid, various common gas flow controlling valves or liquid flow controlling valves may be employed as the first flow controlling valve 17 and the second flow controlling valve 18. It is to be noted that illustrations are made here taking the input pressure pump 11 and the output pressure pump 12 being separate as an example, as described above however, the input pressure pump 11 and the output pump 12 may be integrated into one pressure pump.

Specifically, in the three-dimensional display system provided by the embodiment of the disclosure, the barrier 2 may be a slit barrier or a liquid crystal barrier. Moreover, the slit barrier and the liquid crystal barrier may be implemented in various ways which are not discussed here in detail. By means of the distance adjusting structure 3 adjusting the distance between the barrier 2 and the display device 1, an adjustable viewing distance of the three-dimensional display system may be achieved.

The three-dimensional display system provided by the embodiment of the disclosure has been illustrated using a slit barrier as the barrier 2, and the implementations using a liquid crystal barrier as the barrier 2 may refer to the embodiments using the slit barrier as the barrier 2, which are not discussed here in detail.

Specifically, in the three-dimensional display system provided by the embodiment of the disclosure, the display device 1 may be a liquid crystal display device or a organic electroluminescence display device. Moreover, the liquid crystal display device or organic electroluminescence display device may be of various structures that are not discussed here in detail. By means of the distance adjusting structure 3 adjusting the distance between the barrier 2 and the display device 1, an adjustable viewing distance of the three-dimensional display system may be achieved.

Furthermore, in the case that the display device 1 in the three-dimensional display system provided by the embodiment of the disclosure is a liquid crystal display device, it may specifically be of Advanced Super Dimension Switch (ASDS) type, of Twisted Nematic (TN) type, or of in Plane Switching (IPS) type etc., which are not discussed here in detail.

An embodiment of the present disclosure provides a three-dimensional display system, comprising: a display device, and a barrier located at the light emergent side of the display device. Addition of the distance adjusting structure, which adjusts the viewing distance of the three-dimensional display system by adjusting the distance between the display device and the barrier, between the display device and the barrier allows the three-dimensional display system free from limitation of a fixed viewing distance, thus resulting in a stronger spatially adapting capability and a broader application scope thereof.

Clearly, various modifications and variations can be made to the embodiments of the present disclosure without departing from the spirit and scope of the present disclosure. Thus, if these modifications and variations belong to the scope of the appended claims and the equivalents thereof, the present disclosure is intended to include these modifications and variations.

The invention claimed is:

1. A three-dimensional display system, comprising:
  a display device;
  a barrier located at the light emergent side of the display device; and
  a distance adjusting structure arranged between the display device and the barrier;
  wherein the distance adjusting structure is used to adjust the viewing distance of the three-dimensional display system by adjusting the distance between the display device and the barrier;
  wherein the display device consists of a display region and a boundary-closed non-display region encompassing the display region; and
  wherein the distance adjusting structure comprises at least one hollow cavity arranged at the non-display region, the volume of the hollow cavity being capable of being increased or decreased accordingly by inputting or outputting gas or liquid to/from the hollow cavity, the at least one hollow cavity comprising multiple hollow cavities that are arranged uniformly at the non-display region.

2. The three-dimensional display system according to claim 1, wherein the hollow cavity is a loop cavity encompassing the display region.

3. The three-dimensional display system according to claim 1, wherein the distance adjusting structure further comprises:

at least one pair of an inlet and an outlet arranged on the wall of the hollow cavity, an input pressure pump connected with the inlet, an output pressure pump connected with the outlet, an input valve arranged between the inlet and the input pressure pump, and an output valve arranged between the outlet and the output pressure pump.

4. The three-dimensional display system according to claim 3, wherein the input pressure pump and the output pressure pump are integrated into one pressure pump.

5. The three-dimensional display system according to claim 3, wherein the input pressure pump and the output pressure pump are two separate pressure pumps.

6. The three-dimensional display system according to claim 3, wherein in the hollow cavity, every neighboring two pairs of the inlets and the outlets are equally spaced.

7. The three-dimensional display system according to claim 3, wherein the distance adjusting structure further comprises:

a first flow controller arranged between the inlet and the input valve or between the input valve and the input pressure pump; and a second flow controller arranged between the outlet and the output valve or between the output valve and the output pressure pump.

8. The three-dimensional display system according to claim 1, wherein the amount of increase or decrease in the volume of the hollow cavity is calculated in real time or obtained by looking up a lookup table.

9. The three-dimensional display system according to claim 1, wherein the barrier is a slit barrier or a liquid crystal barrier.

10. The three-dimensional display system according to claim 1, wherein the display device is a liquid crystal display device or an organic electroluminescence display device.

* * * * *